No. 892,157. PATENTED JUNE 30, 1908.
D. L. HUNT.
HORSE DETACHER.
APPLICATION FILED NOV. 4, 1907.
2 SHEETS—SHEET 2.
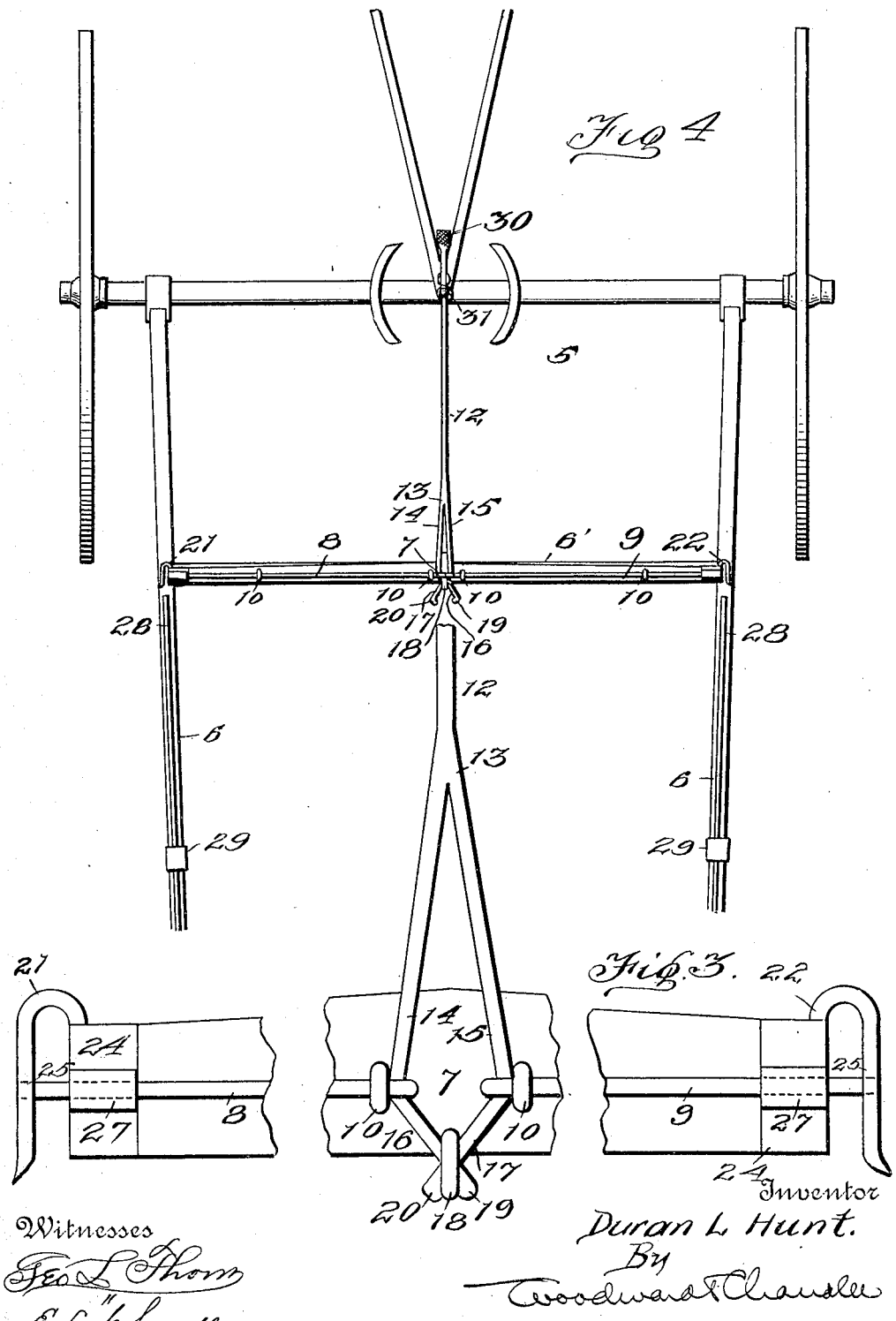
Witnesses
Geo L Thom
E. L. Chandlee
Inventor
Duran L. Hunt.
By
Woodward & Chandlee
Attorneys

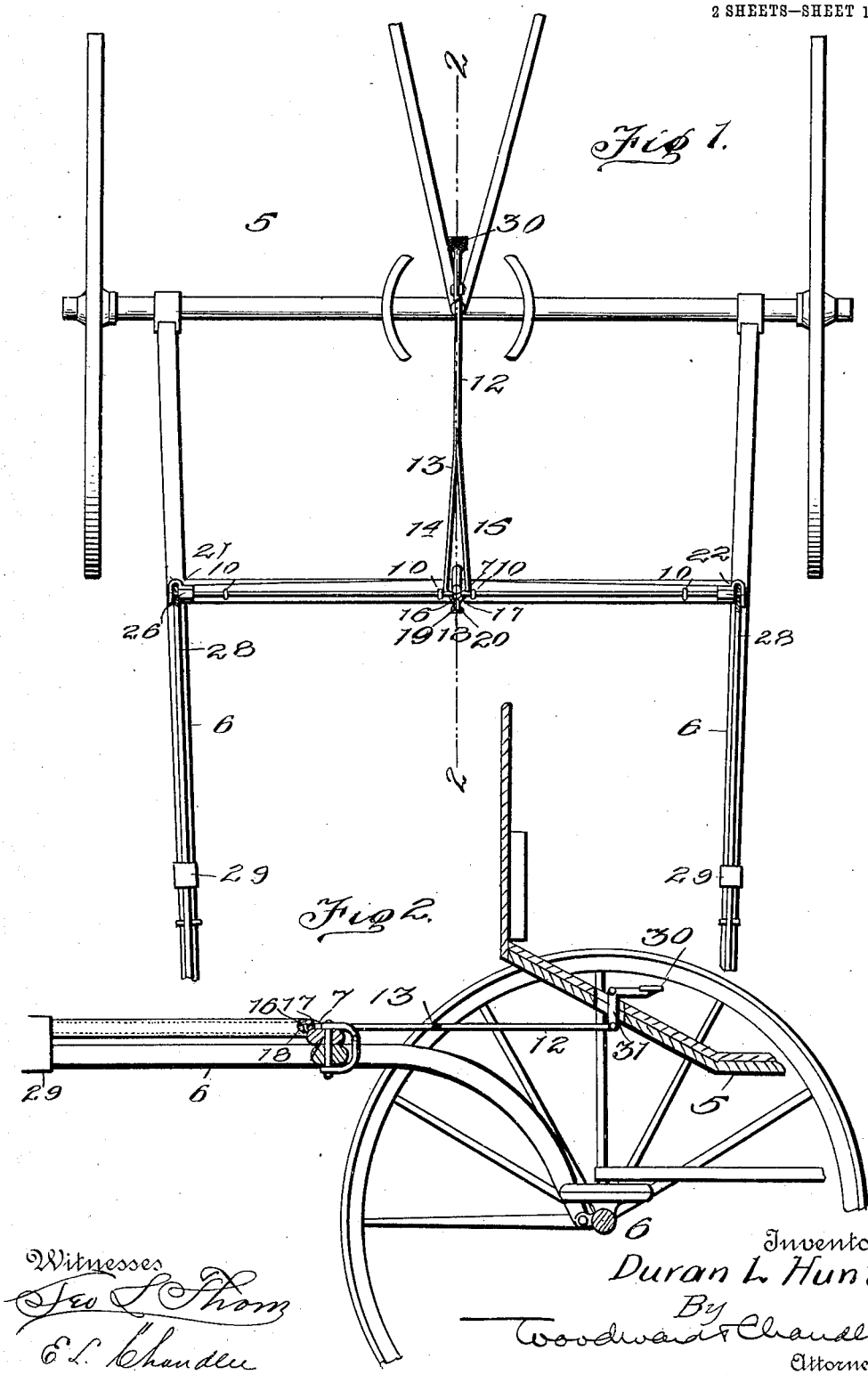

UNITED STATES PATENT OFFICE.

DURAN L. HUNT, OF ASTORIA, SOUTH DAKOTA.

HORSE-DETACHER.

No. 892,157.  Specification of Letters Patent.  Patented June 30, 1908.

Application filed November 4, 1907. Serial No. 400,707.

*To all whom it may concern:*

Be it known that I, DURAN L. HUNT, a citizen of the United States, residing at Astoria, in the county of Deuel and State of South Dakota, have invented certain new and useful Improvements in Horse-Detachers, of which the following is a specification.

This invention relates to carriages and wagons, more particularly to horse detachers, and has for its object to provide a device of this character in which a runaway horse may be easily and quickly released from its shafts.

A further object of this invention is to provide a device of this character which may be made from heavy wire, and thus reduce the cost of manufacturing to a minimum.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate same parts in the several views, Figure 1 is a top plan view of a vehicle and its connecting shafts showing my invention applied thereto, Fig. 2 is a section on the line 2—2 of Fig. 1, Fig. 3 is a detail view of the releasing device, Fig. 4 is a view similar to Fig. 1 showing the traces engaging members disengaged from the trace hooks.

Referring now to the drawings, there is shown a vehicle 5, including the shafts 6 and the connecting swingletree 6' therefor.

Mounted upon the swingletree 6', there is shown a releasing device 7, and this device comprises the bars 8 and 9 respectively, which are slidable longitudinally upon the swingletree 6'. Guide staples 10 are secured to the swingletree and thus serve to guide the bars 8 and 9 respectively in their movement. The bars 8 and 9 are provided with ears 11 at their inner ends for a purpose to be hereinafter described.

A spring wire or rod 12 is provided to complete my invention, and as shown, this wire is formed of a single piece and consists of a yoke member 13 which is arranged to extend inwardly of the vehicle 5, and outwardly of this yoke, the wire is extended to form the outwardly flared arms 14 and 15 respectively which thus extend outwardly of the vehicle. At the outer extremity of these arms, the wire is turned inwardly to produce the arms 16 and 17, and these arms are thus arranged to work in a guide staple 18 which is carried by the swingletree 6'. The arms 16 and 17 outwardly of the staple 18 are turned outwardly to provide hooks 19 and 20 which serve to limit the inward movement of these arms.

Trace engaging hooks 21 and 22 are carried by the swingletree and at the outer ends thereof, and these hooks are carried by caps 24, as shown. The hooks 21 and 22 are provided with alining passages 27 through which the free ends of the members 8 and 9 are slidably arranged.

Traces 28 are engaged with their outer ends over the free ends of the rods 8 and 9, and between the hooks, and these traces are passed through the usual trace loops 29 which are carried by the shafts 6. A foot treadle 30 is carried by the vehicle, and this treadle includes an arm 31 which is pivoted to the yoke member 13.

From the foregoing description it will be seen that upon downward movement of the foot treadle 30, the arms 14 and 15 will be moved forwardly, and in this movement of the arms, it will be apparent that the arms 16 and 17 will ride the staple 18, and in this movement of the arms, the rods 8 and 9 will be moved inwardly to disengage the free ends of the rods from the hooks 21 and 22 and the traces 28. The device being formed of resilient material it will be seen that the bars 8 and 9 will be normally held with their outer ends between the hooks 21 and 22.

What is claimed is:

1. In combination with a vehicle including a swingletree, of bars slidably arranged upon the swingletree and having their outer ends engaged with trace-hooks, the inner ends of the bars being in spaced relation, and means for disengaging the bars from their hooks, said means comprising a resilient wire having inwardly flared arms which are directed toward the vehicle and outwardly flared arms which are connected to the bars.

2. In combination with a vehicle including a swingletree, the swingletree having trace-hooks, of slidable bars carried by the swingletree and arranged for engagement with the trace-hooks, the bars having eyes at their inner ends, a resilient wire engaged with the eyes and having portions directed at an angle and toward each other, said portions being arranged to project inwardly of the vehicle, the wire having portions which are arranged to lie upon the swingletree, said portions being inclined inwardly and toward each other, a staple carried by the swingletree and arranged to guide the last named portions in their movements, the last named portions having hooks and arranged to engage the staple when the sliding bars are in engagement with their trace hooks, and means for operating said wire to bring the bars toward the center of the swingletree.

In testimony whereof I affix my signature, in presence of two witnesses.

DURAN L. HUNT.

Witnesses:
O. C. SOHM,
BENNY SOHM.